(12) United States Patent
Ha et al.

(10) Patent No.: US 11,613,673 B2
(45) Date of Patent: Mar. 28, 2023

(54) ELECTRICAL STEEL SHEET ADHESIVE COATING COMPOSITION, ELECTRICAL STEEL SHEET PRODUCT, AND MANUFACTURING METHOD THEREFOR

(71) Applicant: POSCO, Pohang-si (KR)

(72) Inventors: Bongwoo Ha, Pohang-si (KR); Jung-Woo Kim, Pohang-si (KR); Taeyoung No, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 265 days.

(21) Appl. No.: 16/958,137

(22) PCT Filed: Dec. 17, 2018

(86) PCT No.: PCT/KR2018/016031
§ 371 (c)(1),
(2) Date: Jun. 25, 2020

(87) PCT Pub. No.: WO2019/132355
PCT Pub. Date: Jul. 4, 2019

(65) Prior Publication Data
US 2020/0362202 A1    Nov. 19, 2020

(30) Foreign Application Priority Data
Dec. 26, 2017 (KR) .......... 10-2017-0180116

(51) Int. Cl.
*C09J 1/00* (2006.01)
*B32B 7/12* (2006.01)
(Continued)

(52) U.S. Cl.
CPC ............ *C09J 1/00* (2013.01); *B32B 7/12* (2013.01); *B32B 15/043* (2013.01); *B32B 15/18* (2013.01);
(Continued)

(58) Field of Classification Search
CPC ............ C09J 1/00; C09J 5/00; C09J 2463/00; C09J 2433/00; C09J 2400/12; B32B 15/043;
(Continued)

(56) References Cited

U.S. PATENT DOCUMENTS 6,159,534 A    12/2000  Takeda
2015/0017428 A1*  1/2015  Kim .................. C08K 3/00
                                            523/451
(Continued)

FOREIGN PATENT DOCUMENTS

CN    105765106 A    7/2016
EP    2800103 A1    11/2014
(Continued)

OTHER PUBLICATIONS

Japanese Office Action dated Feb. 8, 2022 issued in Japanese Patent Application No. 2020-536094.
(Continued)

*Primary Examiner* — Ruiyun Zhang
(74) *Attorney, Agent, or Firm* — Morgan, Lewis & Bockius LLP

(57) ABSTRACT

An electrical steel sheet adhesive coating composition according to an exemplary embodiment of the present invention includes, based on 100 wt % of the total solids: a resin at 20 to 40 wt % and having an average particle diameter of 10 to 300 nm; an inorganic nanoparticle at 10 to 35 wt % bonded with the resin; a metal phosphoric acid salt at 10 to 30 wt %; and phosphoric acid at 10 to 40 wt %. An electrical steel sheet product according to an exemplary embodiment of the present invention includes a plurality of electrical steel sheets; and an adhesive layer disposed between the plurality of electrical steel sheets, wherein the adhesive layer includes a metal of one or more kinds among Al, Mg, Ca, Co, Zn, Zr, and Fe at 0.5 to 30 wt %, N at 0.1

(Continued)

to 10 wt %, C at 0.1 to 5 wt %, P at 1 to 30 wt %, a metal of one or more kinds among Si and Ti at 10 to 30 wt %, and a balance of O.

9 Claims, 7 Drawing Sheets

(51) Int. Cl.
    *B32B 15/04* (2006.01)
    *B32B 15/18* (2006.01)
    *B32B 37/12* (2006.01)
    *C09J 5/00* (2006.01)
    *C09J 11/08* (2006.01)

(52) U.S. Cl.
    CPC ............... *B32B 37/12* (2013.01); *C09J 5/00* (2013.01); *C09J 11/08* (2013.01); *B32B 2037/1253* (2013.01); *B32B 2311/30* (2013.01); *C09J 2203/326* (2013.01); *C09J 2400/12* (2013.01); *C09J 2433/00* (2013.01); *C09J 2463/00* (2013.01); *C09J 2475/00* (2013.01)

(58) Field of Classification Search
    CPC .......... B32B 15/18; B32B 7/12; B32B 37/12; B32B 2311/30
    USPC .................................. 428/335; 427/384, 386
    See application file for complete search history.

(56) References Cited

U.S. PATENT DOCUMENTS

| | | |
|---|---|---|
| 2016/0375658 A1 | 12/2016 | Kim et al. |
| 2020/0087760 A1 | 3/2020 | Kim et al. |

FOREIGN PATENT DOCUMENTS

| | | |
|---|---|---|
| EP | 3395923 A1 | 10/2018 |
| EP | 3 561 014 A2 | 10/2019 |
| IN | 201947029238 | 7/2019 |
| JP | 2005-240125 A | 9/2005 |
| JP | 1571838 B2 | 8/2010 |
| JP | 2012-1807 A | 1/2012 |
| JP | 2015-509994 A | 4/2015 |
| JP | 2015-206092 A | 11/2015 |
| JP | 2016-540901 A | 12/2016 |
| JP | 2017-141480 A | 8/2017 |
| JP | 2019-508573 A | 3/2019 |
| JP | 2020-503452 A | 1/2020 |
| KR | 10-0886236 B1 | 3/2009 |
| KR | 10-2011-0072848 A | 6/2011 |
| KR | 10-2014-0060717 A | 5/2014 |
| KR | 10-2014-0062535 A | 5/2014 |
| KR | 10-2014-0099923 A | 8/2014 |
| KR | 10-2015-0061472 A | 6/2015 |
| KR | 10-1736627 A | 5/2017 |
| KR | 10-2017-0074110 A | 6/2017 |
| KR | 10-2017-0075527 A | 7/2017 |
| KR | 10-2018-0074438 A | 7/2018 |
| KR | 10-2019-0077985 A | 7/2019 |
| KR | 10-2019-0078162 A | 7/2019 |
| KR | 10-2019-0078168 A | 7/2019 |
| KR | 10-2019-0110097 A | 9/2019 |
| WO | 2011/102328 A1 | 8/2011 |
| WO | 2017/111244 A | 8/2017 |
| WO | 2018-117670 A2 | 6/2018 |
| WO | 2018/117750 A1 | 6/2018 |

OTHER PUBLICATIONS

Office Action issued by the Japanese Patent Office corresponding to Japanese Application No. 2020-536094, dated Jul. 6, 2021.
Partial Supplementary European Search Report dated Jan. 25, 2021 issued in European Patent Application No. 18894968.9.
Indian Office Action dated Sep. 20, 2021 issued in Indian Patent Application No. 202047030349 (with English translation).
Indian Office Action dated Dec. 21, 2020 issued in Indian Patent Application No. 202047030349 (with English Abstract).
Chinese Office Action and Search Report dated Nov. 18, 2020 issued in Chinese Patent Application No. 201880084867.6.
International Search Report and Written Opinion issued in corresponding International Application No. PCT/KR2018/016031 dated Mar. 29, 2019, with English translation.
Extended European Search Report dated Jun. 2, 2021, issued in corresponding European Patent Application No. 18894968.9.

* cited by examiner

ELECTRICAL STEEL SHEET ADHESIVE COATING COMPOSITION, ELECTRICAL STEEL SHEET PRODUCT, AND MANUFACTURING METHOD THEREFOR

CROSS REFERENCE

This application is the U.S. National Phase under 35 U.S.C. § 371 of International Application No. PCT/KR2018/016031 filed on Dec. 17, 2018, which claims the benefit of Korean Application No. 10-2017-0180116 filed on Dec. 26, 2017, the entire contents of each are hereby incorporated by reference.

TECHNICAL FIELD

The present disclosure relates to an adhesive coating composition for an electrical steel sheet, an electrical steel sheet product, and a method for manufacturing the same. In detail, the present disclosure relates to an adhesive coating composition for an electrical steel sheet, an electrical steel sheet product, and a method for manufacturing the same for improving adherence between electrical steel sheets by controlling a component of an electrical steel sheet adhesive coating composition and a component of an adhesive layer between the electrical steel sheets.

BACKGROUND ART

A non-oriented electrical steel sheet is a steel sheet of which a magnetic property thereof is uniform in all directions on a rolling plate, and is widely used for a motor, an iron core of an electric generator, an electric motor, a small transformer, and the like.

The non-oriented electrical steel sheet may be divided into two types, such as one in which stress-removing annealing (SRA) for improving the magnetic property after punching work should be practiced, and the other in which the SRA is omitted if a cost loss is larger than the effect of the magnetic property by the SRA.

An insulation film is a film coated in a finishing manufacturing process of a product such as a motor, an iron core of a generator, an electric motor, a small transformer, etc., and it is usually required to have electrical characteristics that suppress generation of eddy currents. In addition, continuous punching workability, anti-stickiness, and a surface close contacting property are required. The continuous punching workability indicates an ability to suppress the wear of a mold when a plurality of films are stacked into an iron core after a punching process is performed to have a predetermined shape. The anti-stickiness indicates an ability of not allowing iron core steel sheets to closely stick to each other after a stress relief annealing process for relieving machining stress of a steel sheet to recover a magnetic characteristic.

In addition to such basic characteristics, excellent application workability of a coating solution, solution stability such that it is usable for a long period after mixing, and the like are also required. It is required to use an additional fastening method such as welding, clamping, or interlocking when the insulation film is manufactured as a non-oriented electrical steel sheet product.

An organic material is partially included based on an inorganic material in the coating composition used in the existing fastening method so as to satisfy a basic surface quality such as an insulating property, workability, corrosion resistance, weather resistance, and heat resistance. However, the adhesive coating composition requires thermal fusibility in addition to the basic surface quality mentioned above. To obtain the thermal fusibility, in the coating composition, a composition ratio should be increased in the organic material, and since a fastening force decreases after stress smoothing annealing as the composition ratio of the organic material increases, the adhesive coating composition should be composed of a composition that needs to secure the thermal fusibility and high temperature fastening force.

DISCLOSURE

In an exemplary embodiment of the present invention, an electrical steel sheet adhesive coating composition, an electrical steel sheet product, and a method for manufacturing the same are provided.

In detail, an adhesive coating composition for an electrical steel sheet, an electrical steel sheet product, and a method for manufacturing the same for improving adherence between electrical steel sheets by controlling a component of an electrical steel sheet adhesive coating composition and a component of an adhesive layer between the electrical steel sheets are provided.

An electrical steel sheet adhesive coating composition according to an exemplary embodiment of the present invention includes, based on 100 wt % of the total solids; a resin at 20 to 40 wt % and having an average particle diameter of 10 to 300 nm; inorganic nanoparticles at 10 to 35 wt % bonded with the resin; a metal phosphoric acid salt at 10 to 30 wt %; and phosphoric acid at 10 to 40 wt %.

The inorganic nanoparticles include one or more kinds among $SiO_2$ and $TiO_2$, and the metal phosphoric acid salt includes a metal of one or more kinds among Al, Mg, Ca, Co, Zn, Zr, and Fe.

The inorganic nanoparticles may include $SiO_2$.

The metal phosphoric acid salt may include Al.

An electrical steel sheet product according to an exemplary embodiment of the present invention includes: a plurality of electrical steel sheets; and an adhesive layer disposed between the plurality of electrical steel sheets, wherein the adhesive layer includes a metal of one or more kinds among Al, Mg, Ca, Co, Zn, Zr, and Fe at 0.5 to 30 wt %, N at 0.1 to 10 wt %, C at 0.1 to 5 wt %, P at 1 to 30 wt %, a metal of one or more kinds among Si and Ti at 10 to 30 wt %, and a balance of O.

The metal of one or more kinds among Al, Mg, Ca, Co, Zn, Zr, and Fe may be Al.

The metal of one or more kinds among Si and Ti may be Si.

In the adhesive layer, for a cross-sectional area of the adhesive layer, a fraction of an area occupied by pores may be 10 to 70%.

The thickness of the adhesive layer may be 0.5 to 40 μm.

An average diameter of the pores may be 20% or less of an adhesive layer thickness.

An oxidation layer disposed between the electrical steel sheet and the adhesive layer may be further included.

The oxidation layer may include a metal of one or more kinds among Al, Mg, Ca, Co, Zn, Zr, and Fe at 1 to 20 wt %, N at 0.1 to 10 wt %, C at 0.1 wt % or less, P at 10 to 40 wt %, a metal of one or more kinds among Si and Ti at 5 to 30 wt %, and a balance of O.

In the oxidation layer, for the cross-sectional area of the oxidation layer, a fraction of an area occupied with the pores may be 10% or less. An average diameter of the pores may be 20% or less of an adhesive layer thickness.

The thickness of the oxidation layer may be 10 to 500 nm.

A method for manufacturing an electrical steel sheet product according to an exemplary embodiment of the present invention includes: a step of preparing an adhesive coating composition; a step of coating and curing the adhesive coating composition on the surface of an electrical steel sheet to form an adhesive coating layer; a step of stacking and thermal-fusing a plurality of electrical steel sheets including the adhesive coating layer to form a thermal-fusion layer; and performing stress relief annealing to the thermal-fused electrical steel sheet product to form an adhesive layer.

According to an exemplary embodiment of the present invention, the adherence between the electrical steel sheets may be improved by controlling the components of the electrical steel sheet adhesive coating composition and the components of the adhesive layer formed between the electrical steel sheets.

According to an exemplary embodiment of the present invention, the adherence between the electrical steel sheets may be improved by controlling the pores in the adhesive layer formed between the electrical steel sheets.

According to an exemplary embodiment of the present invention, the electrical steel sheet may be adhered without using a conventional fastening method such as welding, clamping, interlocking, etc., so that the magnetic properties of the electrical steel sheet product are much better.

MODE FOR INVENTION

Figure 1:
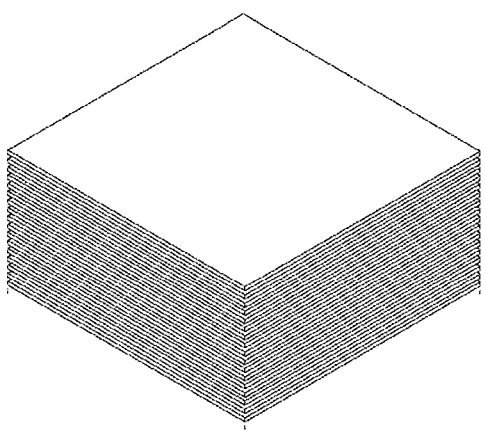
FIG. 1 is a schematic view of an electrical steel sheet product.

The terms first, second, third, and the like are used to describe various portions, components, regions, layers, and/or sections, but the present invention is not limited thereto. These terms are used only to distinguish any portion, component, region, layer, or section from other portions, components, regions, layers, or sections. Therefore, a first portion, component, region, layer, or section to be described below may be referred to as a second portion, component, region, layer, or section without departing from the scope of the present invention.

The technical terms used herein are used merely for the purpose of describing a specific exemplary embodiment, and are not intended to limit the present invention. Singular expressions used herein include plural expressions unless they have definitely opposite meanings. The terms "comprises" and/or "comprising" used in the specification specify features, regions, integers, steps, operations, elements, and/or components, but do not preclude the presence or addition of other particular features, regions integers, steps, operations, elements, and/or components thereof.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In an exemplary embodiment of the present invention, an electrical steel sheet adhesive coating composition, an electrical steel sheet product, and a method for manufacturing the same are provided.

An electrical steel sheet adhesive coating composition according to an exemplary embodiment of the present invention, based on 100 wt % of the total solids, includes: a resin at 20 to 40 wt % having an average particle diameter of 10 to 300 nm; inorganic nanoparticles at 10 to 35 wt % bonded to the resin; a metal phosphoric acid salt at 10 to 30 wt %; and phosphoric acid at 10 to 40 wt %. The electrical steel sheet adhesive coating composition according to an exemplary embodiment of the present invention enables the electrical steel sheet to be adhered (fastened) without using conventional fastening methods such as welding, clamping, and interlocking. In addition, a bonding force may be maintained even after a stress relief annealing process. In an exemplary embodiment of the present invention, the electrical steel sheet may be a non-oriented or oriented electrical steel sheet, and in detail, may be a non-oriented electrical steel sheet.

Hereinafter, each component will be described in detail.

When a resin is hot-pressed to be described later, the resin forms a hot-pressed layer and is interposed between electrical steel sheets to provide adherence between the electrical steel sheets. If the hot-pressed layer does not adequately impart the adherence between the electrical steel sheets, a plurality of electrical steel sheets that are precisely stacked deviate in subsequent processes. If the stacked positions are shifted, the quality of the final manufactured electrical steel sheet product is adversely affected. By ensuring the adherence after being hot-pressed with the resin, it is possible to prevent the position of the stacked electrical steel sheets from shifting.

The resin is partly decomposed in the stress relief annealing step to be described later, but partly remains, thereby providing the adherence between the electrical steel sheets. At this time, the resin containing aromatic hydrocarbons among the resin is not thermally decomposed even at high temperatures, and thus the adherence may be maintained even after the stress relief annealing process, thereby being much better.

The resin containing aromatic hydrocarbon means a resin containing aromatic hydrocarbon in a main chain and/or a side chain. Specifically, the aromatic hydrocarbon may include one or more kinds selected from benzene, toluene, xylene, naphthalene, anthracene, and benzopyrene.

The resin may include one or more kinds selected from among an epoxy-based resin, a siloxane-based resin, an acryl-based resin, a phenol-based resin, a styrene-based resin, a vinyl-based resin, an ethylene-based resin, and a urethane-based resin. At this time, by selecting a mixture of one or two or more kinds among the resins exemplified above, it is possible to improve the heat resistance of the hot-pressed layer and the adhesive layer. In other words, the resin contributes to improving the insulating property, the heat resistance, and the surface characteristic of the hot-pressed layer and the adhesive layer.

The resin may have a weight average molecular weight of 1000 to 100,000 and a number average molecular weight of 1000 to 40,000. With respect to the weight average molecular weight and the number average molecular weight, physical properties of the adhesive coating layer, such as curability and strength, may be deteriorated when it is less than each lower limit value, and phase separation in the resin may occur when it exceeds each upper limit value and compatibility with the metal phosphoric acid salt may be degraded. In detail, the resin may have a weight average molecular weight of 5000 to 30,000.

Also, a softening point Tg of the resin may be 30 to 150° C., and a solid fraction (solid content) may be 10 to 50 wt %. If the softening point Tg of the resin exceeds 120° C., the viscosity of the composition becomes too high so that the coating workability may be deteriorated.

The resin is included with 20 to 40 wt % based on 100 wt % of the total solids of an adhesive coating material. If too little resin is included, a problem may arise that the adherence of the hot-pressed layer may not be properly secured. If too much of the resin is contained, the resin may be partially thermal-decomposed in the stress relief annealing step and thus a problem in which the adherence of the adhesive layer cannot be properly secured may occur. More specifically, the resin may be included in the amount of 25 to 35 wt % based on 100 wt % of the total solids of the adhesive coating material.

The average particle diameter of the resin may be 10 to 300 nm. The resin is partially thermal-decomposed in the stress relief annealing step and the space occupied by the thermal-decomposed water-soluble resin remains empty, thereby forming pores. The content of the resin and the average particle diameter affect the area fraction of pores and the diameter of the pores. Specifically, when the content of the resin is too large and the average particle diameter of the resin is too large, the area fraction of the pores is high and the pores are formed largely, thereby deteriorating the stability of the adhesive layer and deteriorating the adherence. If the content of the resin is too small, and the average particle diameter of the resin is too small, the area fraction of the pores and the diameter of the pores become small, and the resin is not properly included, thereby the thermal fusibility falls and the adherence even after the stress relief annealing is deteriorated. More specifically, the average particle diameter of the resin may be 30 to 100 nm.

The adhesive coating material includes inorganic nanoparticles. As described above, since the organic resin is partially thermal-decomposed in the stress relief annealing step, it is difficult to properly secure the adherence of the adhesive layer with the organic resin alone. The inorganic nanoparticles combined with the organic resins are included to properly impart the adherence to the adhesive layer. The inorganic nanoparticles impart the adherence to the adhesive layer after the stress relief annealing step. In addition, they contribute to preventing precipitation or agglomeration of the metal phosphoric acid salt and the surface characteristics are better expressed after the stress relief annealing.

When the inorganic nanoparticles are not bound to the organic resin and are added alone, the inorganic nanoparticles aggregate and the dispersion does not occur. The meaning of being combined to the organic resin means that a functional group of the organic resin is substituted with an inorganic nanoparticle group to be combined.

The inorganic nanoparticles may include one or more kinds among $SiO_2$ and $TiO_2$. More specifically, it may include $SiO_2$.

The inorganic nanoparticle may have the average particle size of 3 to 50 nm. The appropriate dispersion may be secured in the aforementioned range.

The inorganic nanoparticles may be included in an amount of 10 to 35 wt % based on 100 wt % of the total solids of the adhesive coating material. When the inorganic nanoparticles are not properly included, it may be difficult to properly secure the adherence of the adhesive layer after the stress relief annealing. More specifically, the inorganic nanoparticles may be included at 15 to 30 wt %.

The adhesive coating material contains the metal phosphoric acid salt. The metal phosphoric acid salt used in an exemplary embodiment of the present invention includes a composite metal phosphoric acid salt represented by a chemical formula of $M_x(H_3PO_4)_y$, and a metal phosphoric acid salt (metal phosphate) represented by a chemical formula of $M_x(PO_4)_y$.

The metal phosphoric acid salt includes the metal of one or more kinds among Al, Mg, Ca, Co, Zn, Zr, and Fe. For a detailed example, there are a first aluminum phosphoric acid $(Al(H_3PO_4)_3)$, a first cobalt phosphoric acid $(Co(H_3PO_4)_2)$, a first calcium phosphoric acid $(Ca(H_3PO_4)_2)$, a first zinc phosphoric acid $(Zn(H_3PO_4)_2)$, and a first magnesium phosphoric acid $(Mg(H_3PO_4)_2)$.

The metal phosphoric acid salt contributes to high temperature adherence of a thermal-fusion layer by thermal fusion, high temperature oil resistance, and an adhesion characteristic of an adhesive layer after the stress relief annealing. Since it is included together with the aforementioned organic resin and the inorganic nanoparticles, the adhesive coating composition becomes an organic/inorganic mixed composition.

The metal phosphoric acid salt may be included at 10 to 30 wt % based on 100 wt % of the total solids of the adhesive coating material. If too little metal phosphoric acid salt is included, it may be difficult to properly secure the adherence of the adhesive layer after the stress relief annealing. When too much metal phosphoric acid salt is included, the adherence of the adhesive layer may be rather inferior due to aggregation between the metal phosphoric acid salts. More specifically, the metal phosphoric acid salt may be included in the amount of 15 to 27 wt % based on 100 wt % of the total solids of the adhesive coating material.

The adhesive coating material includes the phosphoric acid. The phosphoric acid contributes to the high temperature adherence of the thermal-fusion layer by the thermal fusion, the high temperature oil resistance, and the adhesion characteristic of the adhesive layer after the stress relief annealing along the above-described metal phosphoric acid salt.

The phosphoric acid may be included in the amount of 10 to 40 wt % based on 100 wt % of the total solids of the adhesive coating material. If too little phosphoric acid is included, it may be difficult to properly secure the adherence of the adhesive layer after the stress relief annealing. Phosphoric acid has a property of absorbing moisture, and when too much phosphoric acid is contained, it may absorb moisture in the adhesive coating composition and then the adhesive coating composition may be aggregated. Due to this, the adherence of the adhesive layer may be inferior. More specifically, the phosphoric acid may be included in the amount of 15 to 35 wt % based on 100 wt % of the total solids of the adhesive coating material.

In an exemplary embodiment of the present invention, a binding strengthening agent may be further included. The binding strengthening agent contributes to maintaining the balance of heat resistance and/or the adherence of the adhesive layer, and particularly to improving the adherence after the stress relief annealing process.

The binding strengthening agent includes one or more kinds selected among an oxide, a hydroxide, carbon nanotubes (CNT), carbon black, a pigment, and a coupling agent.

In detail, the oxide may be one or more kinds among oxidation copper cupric oxide (CuO), aluminum oxide ($Al_2O_3$), calcium oxide (CaO), magnesium oxide (MgO), chromium oxide ($CrO_3$), iron oxide ($Fe_2O_3$), boric acid ($H_3BO_3$), phosphoric acid ($H_3PO_4$), zinc oxide (ZnO), and silica ($SiO_2$). Particularly, as the silica, colloidal silica of which a particle diameter of $SiO_2$ is 3 to 100 nm may be used. More specifically, the content of $SiO_2$ in the aqueous solution may be 10 wt % to 50 wt %.

The hydroxide may be one or more kinds among sodium hydroxide (NaOH), aluminum hydroxide ($Al(OH)_2$), magnesium hydroxide ($Mg(OH)_2$), calcium hydroxide ($Ca(OH)_2$), and potassium hydroxide (KOH).

The carbon nanotubes (CNT) may be those having a width direction diameter of 1 to 15 nm and may be included at 1 to 20 wt % in the aqueous solution.

The carbon black may have a particle diameter of 1 to 20 μm and may be included at 5 wt % to 40 wt % in an aqueous solution.

The pigment may be phthalocyanine-based blue and green and may have a particle diameter of 1 to 30 μm.

The coupling agent may be a silane-based coupling agent, and more specifically, (3-glycidoxypropyl)trimethoxysilane may be used.

The binding strengthening agent may be included in an amount of 1 to 15 wt % based on 100 wt % of the total solids of the adhesive coating composition. If the above range is satisfied, the balance of the heat resistance and/or the adherence of the adhesive layer may be maintained, and particularly the adherence may be superbly improved after the stress relief annealing process. If the content of the binding strengthening agent is too small, the adherence may be inferior after the stress relief annealing. When the content of the binding strengthening agent is too large, the adherence may be deteriorated during the thermal fusion. More specifically, the binding strengthening agent may be included in the amount of 3 to 12 wt %.

In addition to the aforementioned components, the electrical steel sheet adhesive coating composition may include a solvent to facilitate the coating and to disperse the components uniformly. The expression of the aforementioned solid refers to the remaining solid, excluding volatilizing components including the solvent.

The electrical steel sheet product according to an exemplary embodiment of the present invention includes: a plurality of electrical steel sheets; and an adhesive layer disposed between the plurality of electrical steel sheets. FIG. 1 is a schematic view of an electrical steel sheet product according to an exemplary embodiment of the present invention. As shown in FIG. 1, a plurality of electrical steel sheets are stacked.

Figure 2:
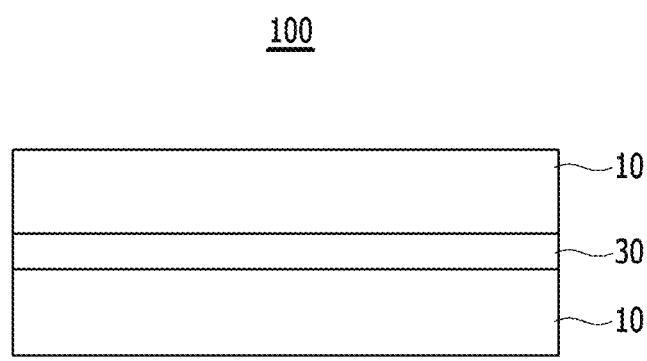
FIG. 2 is a schematic diagram of a cross-section of an electrical steel sheet product according to an exemplary embodiment of the present invention.

FIG. 2 is a schematic diagram of a cross-section of an electrical steel sheet product according to an exemplary embodiment of the present invention. As shown in FIG. 2, the electrical steel sheet product 100 according to an exemplary embodiment of the present invention includes: a plurality of electrical steel sheets 10; and an adhesive layer 30 disposed between the plurality of electrical steel sheets.

The electrical steel sheet product according to an exemplary embodiment of the present invention does not use conventional methods such as welding, clamping, or interlocking, but simply forms the adhesive layer by using the aforementioned adhesive coating composition, thereby thermally fusing the different electrical steel sheets.

In this case, according to the characteristics of the aforementioned adhesive coating composition, the electrical steel sheet product has excellent high temperature adherence and high temperature oil resistance even after thermal fusion, and although it is a product manufactured through the stress relief annealing, there is a characteristic that the surface characteristics and adhesion characteristics are not deteriorated.

Hereinafter, each configuration will be described in detail.

The electrical steel sheet 10 may be used as a normal non-oriented or oriented electrical steel sheet without limitation. In the exemplary embodiment of the present invention, there is a main configuration that the adhesive layer 30 is formed between the plurality of electrical steel sheets 10 to manufacture the electrical steel sheet product 100, thereby the detailed description of the electrical steel sheet 10 is omitted.

The adhesive layer 30 is formed between a plurality of electrical steel sheets 10, and the adherence is strong enough to be able to adhere the plurality of electrical steel sheets 10 without using conventional fastening methods such as welding, clamping, and interlocking.

For the adhesive layer 30, the aforementioned adhesive coating composition is coated on the surface and cured to form the adhesive coating layer, the adhesive coating layer is thermal-fused to form the thermal-fusion layer, and then is subjected to the stress relief annealing, thereby forming the adhesive layer. If the plurality of electrical steel sheets 10 including the adhesive coating layer are stacked and thermal-fused, the resin component in the adhesive coating layer is thermal-fused, thereby forming the thermal-fusion layer. When the stress relief annealing is performed again to the electrical steel sheet product having the thermal-fusion layer, among the adhesive coating composition components, the organic components such as the resin are mostly decomposed into $CO_2$ or CO and some remains. $CO_2$ or CO produced by the decomposition is not fully gasified but some is recombined in the form of a carbide in the adhesive layer 30. In addition, O derived from the organic resin and the metal phosphoric acid salt is produced and grown in an oxide form.

N derived from the stress annealing atmosphere and the atmosphere is produced and grown in the form of a nitride.

The produced and grown carbide, oxide, and nitride ensure the adherence within the adhesive layer 30.

In an exemplary embodiment of the present invention, the adhesive layer 30 includes a metal of one or more kinds among Al, Mg, Ca, Co, Zn, Zr, and Fe at 0.5 to 30 wt %, N at 0.1 to 10 wt %, C at 0.1 to 5 wt %, P at 1 to 30 wt %, a metal of one or more kinds among Si and Ti of 10 to 30 wt %, and a balance of O.

The metal of one or more kinds selected from Al, Mg, Ca, Co, Zn, Zr, and Fe may be derived from the metal phosphoric acid salt within the adhesive coating composition. The metal of one or more kinds selected from Al, Mg, Ca, Co, Zn, Zr, and Fe may be included at 0.5 to 30 wt %. The metal of one or more kinds selected from Al, Mg, Ca, Co, Zn, Zr, and Fe must be included in the above range to ensure proper adherence. More specifically, the metal of one or more kinds selected from Al, Mg, Ca, Co, Zn, Zr, and Fe may be included at 1 to 20 wt %. More specifically, it may be included at 1 to 10 wt %. When two or more kinds of the aforementioned metals are included, they are included in the aforementioned range as the sum of the plurality of metals. More specifically, the metal of one or more kinds selected from Al, Mg, Ca, Co, Zn, Zr, and Fe may be Al.

Phosphorus (P) is derived from the metal phosphoric acid salt and phosphoric acid in the adhesive coating composition. P may be included at 1 to 30 wt % within the adhesive layer. P must be included in an appropriate amount to maintain the adherence. More specifically, P may be included at 3 to 27 wt %.

The metal of one or more kinds among Si and Ti may be derived from $SiO_2$ and $TiO_2$ of the inorganic nanoparticles combined with the resin. More specifically, the metal of one or more kinds among Si and Ti may be Si. The metal of one or more kinds among Si and Ti may be included at 10 to 30 wt %. The metal of one or more kinds among Si and Ti must be included in an appropriate amount to maintain the adherence. More specifically, the metal of one or more kinds among Si and Ti may be included at 15 to 30 wt %.

C, O, and N are combined with the aforementioned P, Si, Ti, Al, Mg, Ca, Co, Zn, Zr, and Fe to produce and grow a carbide, an oxide, or a nitride, thereby ensuring the adherence in the adhesive layer 30. C may be derived from the resin component, and O and N may be derived from the atmosphere. N at 0.1 to 10 wt %, C at 0.1 to 5 wt %, and O forming the balance must be included to ensure the adherence. More specifically, it may be included as N at 0.5 to 8 wt %, C at 0.2 to 3 wt %, and O at 40 to 60 wt %.

The adhesive layer 30 includes pores within the adhesive layer. The pores are a part that exists as an empty space without the solid material.

For the cross-sectional area of the adhesive layer 30, the fraction of the area occupied by the pores may be 10 to 70%. In addition, the average diameter of the pores may be 20% or less of the thickness of the adhesive layer 30. If the area fraction of the pores is too small or the average diameter of the pores is too small, the resin content is small in the adhesive coating composition, so the thermal fusibility falls and the adherence deterioration occurs even after stress relief annealing. When the area fraction of the pores is too large or the average diameter of the pores is too large, the adherence may be deteriorated due to the stability deterioration of the adhesive layer 30. More specifically, for the cross-sectional area of the adhesive layer 30, the fraction of the area occupied by the pores may be 30 to 65%. The average diameter of the pores may be 0.1 to 0.7 μm. The cross-sectional area of the adhesive layer 30 means a cross-sectional area that includes all thicknesses of the steel sheet, and more specifically, a cross-section (a TD surface) of a rolled vertical direction.

The thickness of the adhesive layer 30 may be 0.5 to 40 μm. When this range is satisfied, it may have excellent surface characteristics (e.g., an insulating property, corrosion resistance, a close contacting property, etc.) of the adhesive layer 30.

Figure 3:
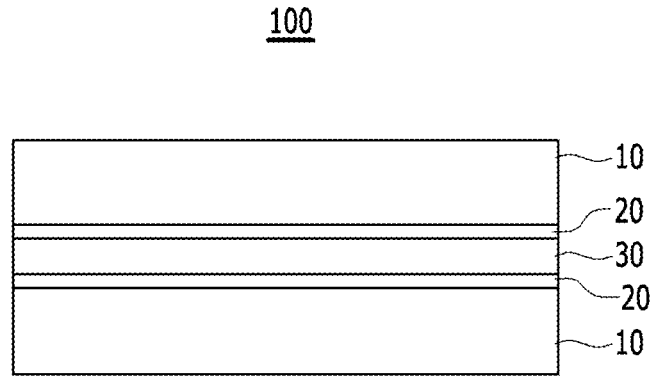
FIG. 3 is a schematic diagram of a cross-section of an electrical steel sheet product according to another exemplary embodiment of the present invention.

FIG. 3 is a schematic diagram of a cross-section of an electrical steel sheet product according to another exemplary embodiment of the present invention. As shown in FIG. 3, the electrical steel sheet product 100 according to an exemplary embodiment of the present invention includes: a plurality of electrical steel sheets 10; an adhesive layer 30 disposed between the plurality of electrical steel sheets; and an oxidation layer 20 disposed between the electrical steel sheet 10 and the adhesive layer 30.

The oxide layers 20 produce a dense passivation layer by a high temperature reaction on the inorganic and metal component provided on the coalescing layer and the oxide provided on a base layer in the stress relief annealing process. As the oxide layer 20 is formed, production of an oxide in the electrical steel sheet 10 may be suppressed, and magnetism of the electrical steel sheet product 100 may be further improved.

The oxidation layer 20 may include the metal of one or more kinds among Al, Mg, Ca, Co, Zn, Zr, and Fe at 1 to 20 wt %, N at 0.1 to 10 wt %, C at 0.1 wt % or less, P at 10 to 40 wt %, the metal of one or more kinds among Si and Ti at 5 to 30 wt %, and the balance of O.

P is derived from phosphoric acid and a metal phosphoric acid salt in the adhesive coating composition like the adhesive layer 30. The metal of one or more kinds among Al, Mg, Ca, Co, Zn, Zr, and Fe is derived from the metal phosphoric acid salt in the adhesive coating composition. The metal of one or more kinds among Si and Ti is derived from the inorganic nanoparticles in the adhesive coating composition. In addition, the oxidation layer 20 may further include Fe, Si, etc. diffused from the electrical steel sheet 10 during the stress relief annealing. The oxidation layer 20 differs from the adhesive layer 30 in that it contains little C.

More specifically, the oxidation layer 20 may include the metal of one or more kinds among Al, Mg, Ca, Co, Zn, Zr, and Fe at 5 to 10 wt %, N at 1 to 7 wt %, C at 0.05 wt % or less, P at 20 to 30 wt %, the metal of one or more kinds among Si and Ti at 10 to 20 wt %, and the balance of O.

In the oxidation layer 20, unlike the adhesive layer 30, the metal phosphoric acid salt and phosphoric acid are preferentially reacted with the electrical steel sheet surface, thereby suppressing the pore formation. Specifically, for the cross-sectional area of the oxidation layer 20, the fraction of the area occupied by the pores may be 10% or less. In addition, the average diameter of the pores may be 20% or less of the thickness of the oxidation layer 20. If the fraction of the area occupied by the pores is too high or the average diameter of the pores is too large, a problem arises in the stability of the oxidation layer 20 and the adhesive layer 30, and the adherence may be deteriorated. More specifically, for the cross-sectional area of the oxidation layer 20, the fraction of the area occupied by the pores may be 5% or less. In addition, the average diameter of the pores may be 10 to 50 nm.

The thickness of the oxidation layer 20 may be 10 to 500 nm. If the thickness of the oxidation layer 20 is too thin, an oxide may be produced in the electrical steel sheet 10, which may adversely affect the magnetism. If the thickness of the oxidation layer 20 is too thick, the close contacting property of the oxidation layer 20 and the adhesive layer 30 is not good, so the bonding strength may be inferior.

The method for manufacturing the electrical steel sheet product according to an exemplary embodiment of the present invention includes: preparing an adhesive coating composition; coating and curing an adhesive coating composition on the surface of the electrical steel sheet to form an adhesive coating layer; stacking and thermal-fusing a plurality of electrical steel sheets on which an adhesive coating layer is formed to form a thermal-fusion layer; and performing stress relief annealing to the thermally-fused electrical steel sheet product to form an adhesive layer.

Hereinafter, each step will be described in detail.

First, the adhesive coating composition is prepared. Since the adhesive coating composition has been described above, the repeated description is omitted.

Next, the adhesive coating composition is coated on the surface of the electrical steel sheet and then cured to form the adhesive coating layer. This step may be performed at a temperature range of 200 to 600° C. for the curing of the adhesive coating composition.

The plurality of electrical steel sheets having the adhesive coating layer are stacked and thermal-fused to form the thermal-fusion layer. Through the step of the thermal fusion, the resin components in the adhesive coating layer are thermally fused and the thermal-fusion layer is formed.

The thermal fusion step may occur at a temperature of 150 to 300° C., a pressure of 0.5 to 5.0 MPa, and a pressing condition of 0.1 to 120 minutes. Each condition may be satisfied independently, and two or more conditions may be satisfied simultaneously. By controlling the temperature, pressure, and time conditions in the thermal-fusion step, the thermal fusion may be densely performed without gaps or pores between the electrical steel sheets.

The thermal-fusion step includes a temperature rising step and a fusing step, and a temperature rising speed of the temperature rising step may be 10° C./min to 1000° C./min.

Next, the thermal-fused electrical steel sheet product is subjected to the stress relief annealing to form the adhesive layer. The stress relief annealing may be performed for 30 to 180 min at the temperature of 500 to 900° C.

The step of forming the adhesive layer may be performed in a modified gas or nitrogen (N$_2$) gas atmosphere. Specifically, the modified gas means a gas containing 10 to 30 vol % of liquefied natural gas (LNG) and 70 to 90 vol % of air. The nitrogen atmosphere means an atmosphere including nitrogen. Specifically, it means a gas containing nitrogen at 100 vol % or at 90 to less than 100 vol %, and containing hydrogen at more than 0 to 10 vol %.

The step of forming the adhesive layer may further produce an oxidation layer between the adhesive layer and the electrical steel sheet. Since the adhesive layer and the oxidation layer have been described above, redundant description is omitted.

When being manufactured by the manufacturing method of the electrical steel sheet product according to the exemplary embodiment of the present invention, the magnetic properties (specifically, the iron loss, the magnetic flux density, etc.) of the electrical steel sheet itself are not only improved even after stress relief annealing, but also the high temperature adherence and high temperature oil resistance of the adhesive coating layer are excellent, and particularly, the surface characteristic and the adhesion characteristic may not be deteriorated even after stress relief annealing.

Hereinafter, preferred examples of the present invention, comparative examples in contrast thereto, and evaluation examples thereof will be described. However, the following examples are only exemplary embodiments of the present invention, and the present invention is not limited to the following examples.

Experimental Example 1

An adhesive coating composition is shown in Table 1 below. An average of an inorganic nanoparticle size is 30 nm.

A non-oriented electrical steel sheet (50×50 mm, 0.35 mmt) is prepared as a blank specimen. An adhesive coating solution composed of components listed in Table 1 below was coated on the blank specimens each prepared by using a bar coater and a roll coater with a certain thickness (approximately 5.0 μm) upwardly and downwardly, and they were cured at 200 to 250° C. based on a plate temperature for 20 s and slowly cooled in air to form an adhesive coating layer.

An electrical steel sheet on which the adhesive coating layer was coated was stacked to a height of 20 mm and pressed by a force of 500 kgf to be thermal-fused at 220° C. for 60 min. The electrical steel sheet obtained under the fusion condition was subjected to stress relief annealing in an atmosphere of 780° C. and nitrogen at 100 vol % as a stress relief annealing condition. The adherence of the electrical steel sheet thermal-fused for each condition and the adherence for each electrical steel sheet to which the stress relief annealing was performed were measured by a shearing surface tension method.

The specific evaluation conditions are as follows.

Adherence: the adherence was measured after and before the stress relief annealing by using a device that fixes a sample on upper/lower jigs with a certain force and then pulls at a constant speed to measure a tensile force of a stacked sample. At this time, the measured value was measured at the point where the interface having the minimum adherence separates among the interfaces of the stacked sample. The measured adherence is summarized and shown in Table 2 below.

Also, an element component of the adhesive layer was analyzed and summarized in Table 2 below, and the content and size of a pore for a TD surface were analyzed and are summarized in Table 2.

TABLE 1

| | | Resin | | Inorganic nanoparticles | | Metal phosphoric acid salt | | Phosphoric acid |
| | | | Average | | | | | |
| | | | particle | | | | | |
| | | Content | diameter | | Content | | Content | Content |
| Remark | Kind | (wt %) | (nm) | Kind | (wt %) | Kind | (wt %) | (wt %) |
| Example 1 | epoxy | 25 | 20 | SiO$_2$ | 30 | Al(H$_2$PO$_4$)$_3$ | 10 | 35 |

TABLE 1-continued

| | Resin | | | Inorganic nanoparticles | | Metal phosphoric acid salt | | Phosphoric acid |
|---|---|---|---|---|---|---|---|---|
| Remark | Kind | Content (wt %) | Average particle diameter (nm) | Kind | Content (wt %) | Kind | Content (wt %) | Content (wt %) |
| Example 2 | epoxy | 30 | 100 | $SiO_2$ | 10 | $Al(H_2PO_4)_3$ | 30 | 30 |
| Example 3 | epoxy | 20 | 200 | $SiO_2$ | 25 | $(Zn(H_2PO_4)_2$ | 20 | 35 |
| Example 4 | acryl | 20 | 50 | $SiO_2$ | 20 | $Mg(H_2PO_4)_2$ | 20 | 40 |
| Example 5 | urethane | 30 | 100 | $TiO_2$ | 10 | $Al(H_2PO_4)_3$ | 30 | 30 |
| Comparative Example 1 | epoxy | 30 | 150 | $SiO_2$ | 10 | $Al(H_2PO_4)_3$ | 40 | 20 |
| Comparative Example 2 | epoxy | 30 | 100 | $SiO_2$ | 10 | $Al(H_2PO_4)_3$ | 5 | 55 |
| Comparative Example 3 | epoxy | 20 | 50 | $SiO_2$ | 40 | $Al(H_2PO_4)_3$ | 10 | 30 |
| Comparative Example 4 | epoxy | 30 | 100 | $SiO_2$ | 5 | $Al(H_2PO_4)_3$ | 25 | 40 |
| Comparative Example 5 | epoxy | 25 | 500 | $SiO_2$ | 20 | $Al(H_2PO_4)_3$ | 20 | 35 |
| Comparative Example 6 | epoxy | 10 | 50 | $SiO_2$ | 35 | $Al(H_2PO_4)_3$ | 20 | 35 |

TABLE 2

| | Adhesive layer component (wt %) | | | | | | Adhesive layer structure | | | |
|---|---|---|---|---|---|---|---|---|---|---|
| Remark | P | Al, Mg, Ca, Co, Zn, Zr, Fe | Si, Ti | C | N | O | Pore area fraction (%) | Pore average diameter (μm) | Adhesive layer thickness (μm) | Adherence (MPa) |
| Example 1 | 5 | Al:1 | Si:20 | 1.4 | 1 | 71.6 | 30 | 0.2 | 10 | 0.3 |
| Example 2 | 25 | Al:7 | Si:15 | 3 | 7 | 43 | 40 | 0.5 | 15 | 0.25 |
| Example 3 | 10 | Zn:2 | Si:30 | 0.5 | 5 | 49.5 | 20 | 0.7 | 20 | 0.15 |
| Example 4 | 20 | Mg:3 | Si:30 | 1 | 3 | 43 | 50 | 0.2 | 6 | 0.35 |
| Example 5 | 25 | Al:5 | Ti:25 | 0.5 | 2 | 42.5 | 40 | 0.6 | 20 | 0.3 |
| Comparative Example 1 | 35 | Al:15 | Si:15 | 0.3 | 0.2 | 34.5 | 30 | 0.3 | 5 | 0.05 |
| Comparative Example 2 | 0.5 | Al:0.2 | Si:27 | 5 | 7 | 60.3 | 55 | 0.5 | 10 | 0.07 |
| Comparative Example 3 | 2 | Al:0.5 | Si:35 | 2 | 3 | 57.5 | 35 | 0.2 | 4 | 0.02 |
| Comparative Example 4 | 15 | Al:5 | Si:5 | 15 | 5 | 55 | 40 | 0.4 | 5 | 0.03 |
| Comparative Example 5 | 15 | Al:5 | Si:10 | 1 | 2 | 67 | 50 | 1 | 3 | 0.02 |
| Comparative Example 6 | 10 | Al:5 | Si:10 | 2 | 3 | 70 | 5 | 0.4 | 7 | 0 |

As shown Table 1 and Table 2, in Example 1 to Example 5, which satisfy all the components and component ratios of the present application, it may be confirmed that all adherences of the adhesive layers are excellent.

On the other hand, in Comparative Examples 1 and 2, the content of the metal phosphoric acid salt was too large or too small, the P content was too large or too small in the adhesive layer, and the adherence of the adhesive layer could not be adequately secured.

In Comparative Examples 3 and 4, the content of the inorganic nanoparticles was too large or too small, the content of Si in the adhesive layer was too large or too small, and the adherence of the adhesive layer could not be adequately secured.

In Comparative Example 5, the average particle diameter of a resin was too large, the pore average diameter in the adhesive layer was too large, and the adequate adherence could not be secured.

In Comparative Example 6, the content of the resin was too small, resulting in small pores, and could not secure adequate adherence.

Figure 4:
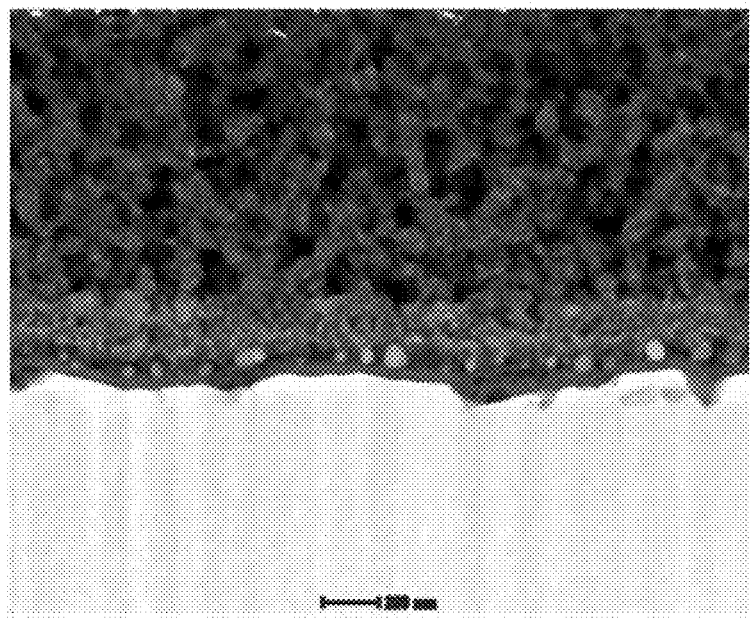
FIG. 4 is a transmission electron microscope (TEM) photograph of a cross-section of an electrical steel sheet product in Example 1.

FIG. 4 is a transmission electron microscope (TEM) photograph of a cross-section of an electrical steel sheet product in Example 1. A dark black color parts are the pores, and the boundary between the adhesive layer, the oxidation layer, and the electrical steel sheet may be clearly identified.

Figure 5:
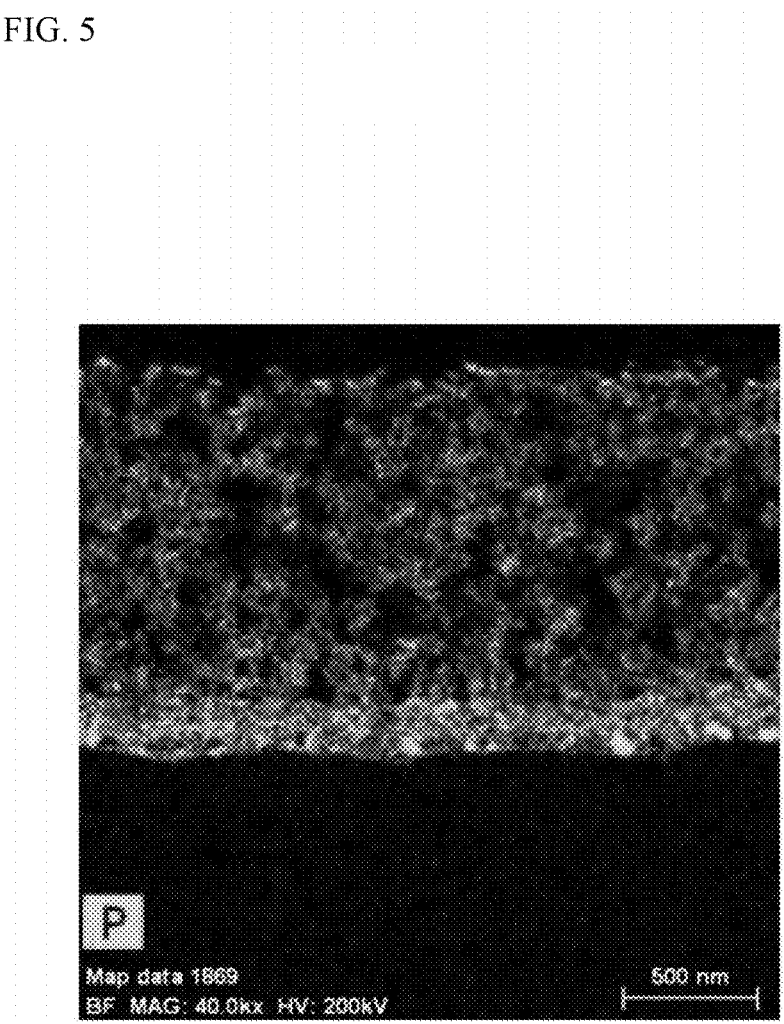
FIG. 5 shows a P element analysis result in electron punching minute analysis (EPMA) of an electrical steel sheet product in Example 1.
Figure 6:
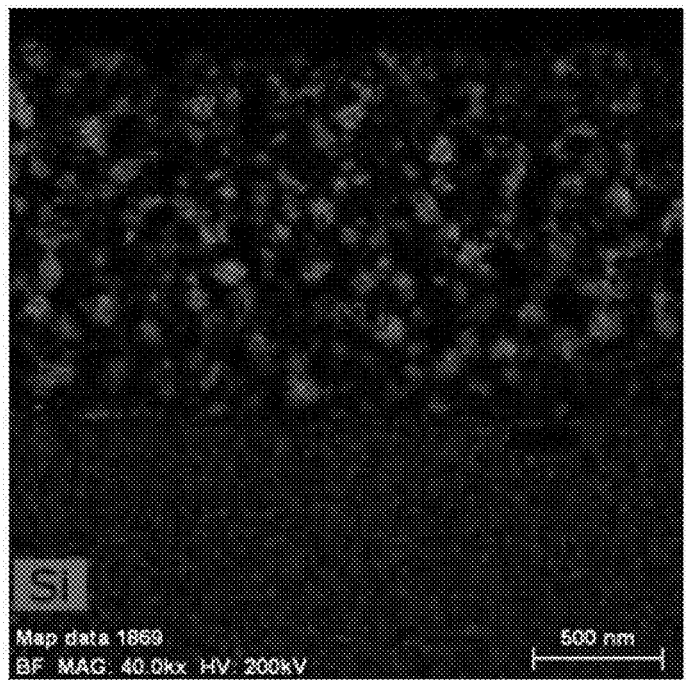
FIG. 6 shows a Si element analysis result in electron punching minute analysis (EPMA) of an electrical steel sheet product in Example 1.
Figure 7:
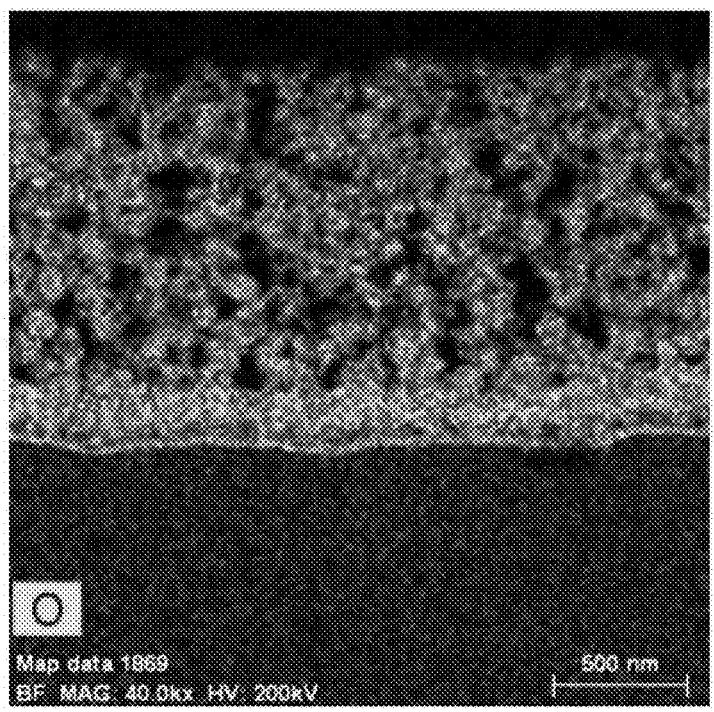
FIG. 7 shows an O element analysis result in electron punching minute analysis (EPMA) of an electrical steel sheet product in Example 1.

FIG. 5 to FIG. 7 represent P, Si, and O element analysis results of an electrical steel sheet product, respectively. As shown in FIG. 5 to FIG. 7, it may be confirmed that P, Si, and O are uniformly distributed except at the pore portion in the adhesive layer and oxidation layer. It may be confirmed that O is formed in a large amount in the oxidation layer compared to the adhesive layer.

Experimental Example 2

The adhesive coating composition is shown in Table 3 below. Except for the adhesive coating composition, it was carried out in the same manner as in the aforementioned Experimental Example 1.

An adhesive layer component and adhesive layer structure are summarized in Table 4 below. Also, the oxidation layer component, the oxidation layer structure, and the adherence are summarized in Table 5 below.

TABLE 3

| | Resin | | | Inorganic nanoparticle | | Metal phosphoric acid salt | | Phosphoric acid |
|---|---|---|---|---|---|---|---|---|
| Remark | Kind | Content (wt %) | Average particle diameter (nm) | Kind | Content (wt %) | Kind | Content (wt %) | Content (wt %) |
| Example 6 | epoxy | 30 | 20 | $SiO_2$ | 20 | $Al(H_2PO_4)_3$ | 15 | 35 |
| Example 7 | epoxy | 20 | 50 | $SiO_2$ | 35 | $Al(H_2PO_4)_3$ | 35 | 15 |
| Example 8 | epoxy | 40 | 100 | $SiO_2$ | 25 | $Zn(H_2PO_4)_2$ | 20 | 35 |
| Example 9 | acryl | 20 | 50 | $TiO_2$ | 30 | $Mg(H_2PO_4)_2$ | 30 | 20 |
| Comparative Example 7 | epoxy | 20 | 50 | $SiO_2$ | 15 | $Al(H_2PO_4)_2$ | 15 | 50 |
| Comparative Example 8 | urethane | 30 | 100 | $TiO_2$ | 5 | $Al(H_2PO_4)_3$ | 30 | 35 |
| Comparative Example 9 | epoxy | 30 | 20 | $SiO_2$ | 20 | phenyl phosphoric acid | 20 | 30 |
| Comparative Example 10 | epoxy | 30 | 20 | $SiO_2$ | 20 | phenyl phosphoric acid | 20 | 30 |

TABLE 4

| | Adhesive layer component (wt %) | | | | | | Adhesive layer structure | | |
|---|---|---|---|---|---|---|---|---|---|
| Remark | P | Al, Mg, Ca, Co, Zn, Zr, Fe | Si, Ti | C | N | O | Pore area fraction (%) | Pore average diameter (μm) | Adhesive layer thickness (μm) |
| Example 6 | 7 | Al:4 | Si:20 | 1.4 | 1 | 61.6 | 25 | 0.3 | 10 |
| Example 7 | 20 | Al:7 | Si:20 | 3 | 7 | 43 | 45 | 0.7 | 15 |
| Example 8 | 15 | Zn:5 | Si:30 | 0.5 | 5 | 49.5 | 20 | 1 | 15 |
| Example 9 | 20 | Mg:3 | Si:15 | 1 | 3 | 58 | 50 | 0.2 | 6 |
| Comparative Example 7 | 40 | Al:4 | Si 10 | 1 | 2 | 43 | 45 | 0.7 | 25 |
| Comparative Example 8 | 30 | Al:5 | Si:5 | 1 | 2 | 57 | 30 | 0.4 | 15 |
| Comparative Example 9 | 10 | Al:5 | Ti:10 | 2 | 3 | 70 | 5 | 0.4 | 7 |
| Comparative Example 10 | 15 | Al:5 | Si:10 | 1 | 2 | 67 | 50 | 1 | 3 |

TABLE 5

| | | Oxidation layer component (wt %) | | | | | Oxidation layer structure | | | |
|---|---|---|---|---|---|---|---|---|---|---|
| Remark | P | Al, Mg, Ca, Co, Zn, Zr, Fe | Si, Ti | C | N | O | Pore area fraction (%) | Pore average diameter (nm) | Oxidation layer thickness (nm) | Adherence (MPa) |
| Example 6 | 20 | Al:2 Fe:3 | Si:18 | 0 | 3 | 54 | 2 | 10 | 150 | 0.3 |
| Example 7 | 30 | Al:3 Fe:7 | Si:10 | 0.05 | 7 | 42.95 | 3 | 15 | 200 | 0.25 |
| Example 8 | 20 | Zn:5 Fe:7 | Si:5 | 0.03 | 3 | 59.97 | 5 | 20 | 200 | 0.25 |
| Example 9 | 10 | Mg:3 Fe:5 | Ti:3 | 0.05 | 2 | 76.95 | 0 | 50 | 400 | 0.2 |
| Comparative Example 7 | 3 | Al: 0.1 Fe: 0.3 | Si:25 | 3 | 4 | 64.6 | 3 | 20 | 250 | 0.05 |
| Comparative Example 8 | 15 | Al:3 Fe:5 | Si:40 | 0.03 | 5 | 31.97 | 3 | 50 | 500 | 0.03 |
| Comparative Example 9 | 25 | Al:2 Fe:3 | Si:18 | 0 | 3 | 49 | 20 | 15 | 300 | 0.03 |
| Comparative Example 10 | 25 | Al:1 Fe:3 | Si:13 | 0 | 3 | 55 | 5 | 100 | 300 | 0.04 |

As shown in Table 3 to Table 5, in Example 6 to Example 9 satisfying both the components and component ratios of the present application, it may be confirmed that all adherences were excellent.

On the other hand, in Comparative Example 7, the content of the phosphoric acid was low in the adhesive coating composition, the content of P in the adhesive layer and the oxidation layer was low, and the adherence was poor.

In Comparative Example 8, the content of the inorganic nanoparticles in the adhesive coating composition was high such that the Si content in the adhesive layer and the oxidation layer was analyzed to be in excess and the adherence was inferior.

In Comparative Examples 9 and 10, where a phenol-based phosphoric acid of the organic phosphoric acid salt is added instead of the metal phosphoric acid salt, the adhesive layer and the oxidation layer have a very high pore area fraction or a large pore diameter, and the adherence was inferior.

The present invention is not limited to the exemplary embodiments, but may be implemented in various different forms. It may be understood by those skilled in the art to which the present invention pertains that the present invention may be implemented with other specific forms without changing the spirit or essential features thereof. Therefore, it should be understood that the above-mentioned embodiments are not restrictive but are exemplary in all aspects.

DESCRIPTION OF SYMBOLS

| 100: electrical steel sheet product | 10: electrical steel sheet |
|---|---|
| 20: oxidation layer | 30: adhesive layer |

The invention claimed is:

1. An electrical steel sheet product comprising:
   a plurality of electrical steel sheets; and
   an adhesive layer disposed between the plurality of electrical steel sheets,
   wherein the adhesive layer includes:
   a first metal at 0.5 to 30 wt %, the first metal is at least one element selected from the group consisting of Al, Mg, Ca, Co, Zn, Zr, and Fe;
   N at 0.1 to 10 wt %;
   C at 0.1 to 5 wt %;
   P at 1 to 30 wt %;
   a second metal at 10 to 30 wt %, the second metal is at least one element selected from the group consisting of Si and Ti; and
   a balance of O, and
   in the adhesive layer, for a cross-sectional area of the adhesive layer, a fraction of an area occupied by pores is 10 to 70% and an average diameter of the pores is 20% or less of an adhesive layer thickness.

2. The electrical steel sheet product of claim 1, wherein the first metal is Al.

3. The electrical steel sheet product of claim 1, wherein the second metal is Si.

4. The electrical steel sheet product of claim 1, wherein the thickness of the adhesive layer is 0.5 to 40 μm.

5. The electrical steel sheet product of claim 1, further comprising
   an oxidation layer disposed between the electrical steel sheet and the adhesive layer.

6. The electrical steel sheet product of claim 5, wherein the oxidation layer includes:
   a third metal at 1 to 20 wt %, the third metal is at least one element selected from the group consisting of Al, Mg, Ca, Co, Zn, Zr, and Fe;

N at 0.1 to 10 wt %;
C at 0.1 wt % or less;
P at 10 to 40 wt %;
a fourth metal at 5 to 30 wt %, the fourth metal is at least one element selected from the group consisting of Si and Ti; and
a balance of O.

7. The electrical steel sheet product of claim 5, wherein in the oxidation layer, for the cross-sectional area of the oxidation layer, a fraction of an area occupied with the pores is 10% or less.

8. The electrical steel sheet product of claim 5, wherein the thickness of the oxidation layer is 10 to 500 nm.

9. The electrical steel sheet product of claim 5, wherein the average diameter of the pores is 20% or less of the oxidation layer thickness.

* * * * *